(12) United States Patent
Torres et al.

(10) Patent No.: US 11,138,423 B2
(45) Date of Patent: Oct. 5, 2021

(54) REGION PROPOSAL NETWORKS FOR AUTOMATED BOUNDING BOX DETECTION AND TEXT SEGMENTATION

(71) Applicant: Intuit Inc., Mountain View, CA (US)

(72) Inventors: Terrence J. Torres, Mountain View, CA (US); Homa Foroughi, Edmonton (CA)

(73) Assignee: Intuit Inc., Mountain View, CA (US)

( * ) Notice: Subject to any disclaimer, the term of this patent is extended or adjusted under 35 U.S.C. 154(b) by 108 days.

(21) Appl. No.: 16/524,882

(22) Filed: Jul. 29, 2019

(65) Prior Publication Data

US 2021/0034856 A1 Feb. 4, 2021

(51) Int. Cl.
- *G06K 9/34* (2006.01)
- *G06K 9/00* (2006.01)
- *G06K 9/62* (2006.01)
- *G06N 3/08* (2006.01)

(52) U.S. Cl.
CPC ......... *G06K 9/00463* (2013.01); *G06K 9/342* (2013.01); *G06K 9/344* (2013.01); *G06K 9/6256* (2013.01); *G06N 3/08* (2013.01)

(58) Field of Classification Search
CPC combination set(s) only.
See application file for complete search history.

(56) References Cited

U.S. PATENT DOCUMENTS

| | | | |
|---|---|---|---|
| 10,198,671 B1 * | 2/2019 | Yang | G06T 7/11 |
| 10,878,270 B1 * | 12/2020 | Cao | G06K 9/325 |
| 2007/0206877 A1 | 9/2007 | Wu et al. | |
| 2008/0144971 A1 | 6/2008 | Wu et al. | |
| 2010/0239165 A1 | 9/2010 | Wu et al. | |
| 2013/0230254 A1 | 9/2013 | Wu et al. | |
| 2015/0347837 A1 | 12/2015 | Wu et al. | |
| 2019/0138850 A1 * | 5/2019 | Sigal | G06K 9/481 |

OTHER PUBLICATIONS

International Search Report dated Sep. 14, 2020 issued in International Application No. PCT/US2020/038023 (5 pages).
Written Opinion dated Sep. 14, 2020 issued in International Application No. PCT/US2020/038023 (11 pages).

(Continued)

*Primary Examiner* — Tsung Yin Tsai
(74) *Attorney, Agent, or Firm* — DLA Piper LLP (US)

(57) ABSTRACT

Arbitrary image data may be transformed into data suitable for optical character recognition (OCR) processing. A processor may generate a plurality of intermediate feature layers of an image using convolutional neural network (CNN) processing. For each intermediate feature layer, the processor may generate at least one text proposal using a region proposal network (RPN). The at least one text proposal may comprise a portion of the intermediate feature layer that is predicted to contain text. The processor may merge the text proposals with one another to form a patch of the image that is predicted to contain text. The processor may determine outer coordinates of the patch. The outer coordinates may comprise at least leftmost, rightmost, topmost, and bottommost coordinates. The processor may generate a quadrilateral of the image that is a smallest quadrilateral including the leftmost, rightmost, topmost, and bottommost coordinates.

23 Claims, 16 Drawing Sheets

(56) References Cited

OTHER PUBLICATIONS

Liu et al. "Text Detection in Natural Scene Images with Text Line Construction", 2018 IEEE International Conference on Information Commuication and Signal Processing, IEEE, Sep. 28, 2018, (5 pages).

Javed et al. "Real-Time Document Localization in Natural Images by Recursive Application of a CNN", 2017 14th IAPR International Conference on Document Analysis and Recognition (ICDAR), IEEE, vol. 1, Nov. 9, 2017, (6 pages).

* cited by examiner

FIG. 5B

REGION PROPOSAL NETWORKS FOR AUTOMATED BOUNDING BOX DETECTION AND TEXT SEGMENTATION

BRIEF DESCRIPTION OF THE FIGURES

FIG. 5B shows a merger of text regions according to an embodiment of the present disclosure.

DETAILED DESCRIPTION OF SEVERAL EMBODIMENTS

Figure 1:
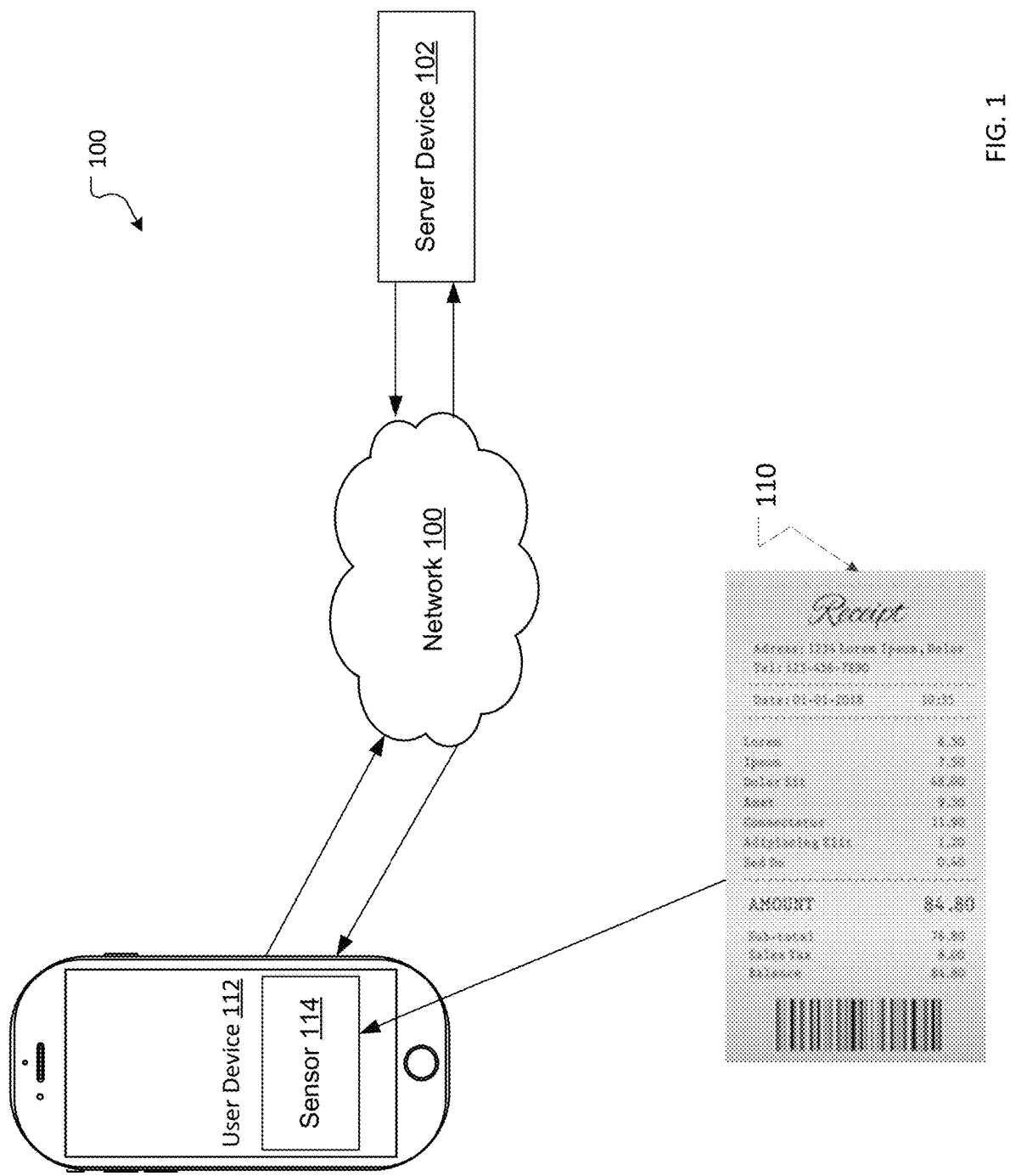
FIG. 1 shows a system configured to scan documents according to an embodiment of the present disclosure.

It is often useful to digitize information found on paper or other physical documents such as receipts and tax forms. The process of recognizing and digitizing the information often leverages sophisticated optical character recognition (OCR) to discern text, numerals, and/or other information-carrying characters from other features of the physical documents. For example, an imaging device or other computing device may obtain an image of a physical document and may apply OCR to the image to identify information. OCR effectiveness can be hindered by issues with image quality, such as background features of the image that blur or otherwise obscure characters in the image. Moreover, OCR can be processing intensive and/or inefficient, for example in cases wherein an entire image is analyzed to find and identify characters within. Researchers have proposed numerous methods for detecting text in natural images, such as methods that predict the presence of text and localizing each instance (if any), usually at word or line level, in natural scenes. However, these algorithms are often extremely difficult to successfully apply to images due to major challenges such as plentiful text in the image, complexity of background, and interference factors such as noise, lighting, etc.

Embodiments described herein may improve pre-processing of images to enhance the effectiveness and/or efficiency of OCR. For example, some embodiments may perform de-skewing and/or cropping of an image before it is processed using OCR. De-skewing and/or cropping may reduce background interference and/or align the documents in an image, thereby enhancing any text characters in the images for improved OCR results. Thus, by removing cluttered backgrounds in images and aligning identified text, such text can be more accurately processed using OCR. This may be accomplished by identifying four corners of a document to then de-skew and rotate text within the document as well as eliminate background clutter.

Some embodiments may employ an automated process to create labelled data for a keypoint detection network (and/or any other cropping network) which may efficiently and accurately find the corner points for an image. For example, embodiments may use region proposal networks (RPNs) to identify tight bounding boxes around all the words in an image. RPNs are a type of neural network for computer vision that aims to localize objects within images by providing predicted bounding boxes around objects within a trained set of categories (e.g., person, car, street lamp, etc.). Recently these types of networks have shown good results in identifying and segmenting text within mobile images. This RPN-based bounding box processing may be followed by looking for most left and right corners at both horizontal and vertical directions to form the corner points for the image. The image and corresponding quadrilateral (which shows the cropped image) may serve as the input of a keypoint detection network that may identify the four corners of the portion of the document containing text, so that portion may be de-skewed and/or cropped. Disclosed methods to identify these portions may perform well even in conditions where documents are at low contrast with a background (e.g., white paper on a white table).

In addition to and/or alternatively to the pre-processing, embodiments described herein may improve OCR processing itself. For example, OCR processing may include multiple stages, such as a first stage to segment an image into local character-level segments, followed by a classification stage to classify the segmented character map piece by piece. If either of these stages fail, the end product is usually a poor quality OCR result. Moreover, the second classification stage may be very sensitive to, and dependent on, the first segmentation stage. This first segmentation stage can be adversely impacted by image orientations in 3 dimensions leading to curved text lines and warped characters. To compensate and/or correct for this, some embodiments may use an RPN to map out word-level segmentations of image text so that the effects of curved or warped document images can be largely mitigated. These words may then be processed, either individually or in groups of neighboring words, and the OCR results may be recombined in a post-processing procedure. By passing low-quality images initially to RPNs, embodiments described herein may generate accurate word segments even for images that are blurred or skewed or that have additional, non-text background.

Some embodiments described herein may provide end-to-end data extraction for various types of documents. For example, submitting expenses is an important part of money management for self-employed people and business employees. With the availability of scanners and smart-phones that can quickly take a picture of a receipt, many platforms may offer the ability to snap a receipt and quickly attach it to an expense report. Some embodiments described herein may provide end-to-end receipt extraction, which may intake an image of a receipt and automatically extract relevant data which may be added into an expense report. Some embodiments may be able to extract some specific fields such as date, merchant information, total amount, and credit card information, but other examples may be configured or customized to extract data from any types of document according to any specific needs.

FIG. 1 shows a system 100 configured to scan documents according to an embodiment of the present disclosure. For example, user device 112 may be configured to scan document 110. User device 112 may include one or more sensors 114 capable of capturing an image of document 110. For example, sensor 114 may be a camera. In some embodiments, user device 112 may present a user interface (UI) for capturing, viewing, and/or submitting document 110 to other software on user device 112 or other devices (e.g., server device 102). Processes and/or features related to recognizing, capturing, and processing documents 110 are described in detail below. User device 112 is depicted as a single portable device for ease of illustration, but those of ordinary skill in the art will appreciate that user device 112 may be embodied in different forms for different implementations. For example, a plurality of user devices 112 may be connected to network 100, and/or user device(s) 112 may be any type of computing device, such as a laptop, personal computer, tablet, etc. In some embodiments, user device 112 may communicate the results of document 110 scanning to server device 102 through network 100 (e.g., to submit receipt information obtained from document 110 for reimbursement or other accounting purposes). Network 100 may include the Internet and/or another public and/or private network. In other embodiments user device 112 itself may perform all processing described below. Sensor 114 may be integrated in user device 112, attached to user device 112, or may be separate from user device 112.

Figure 2:
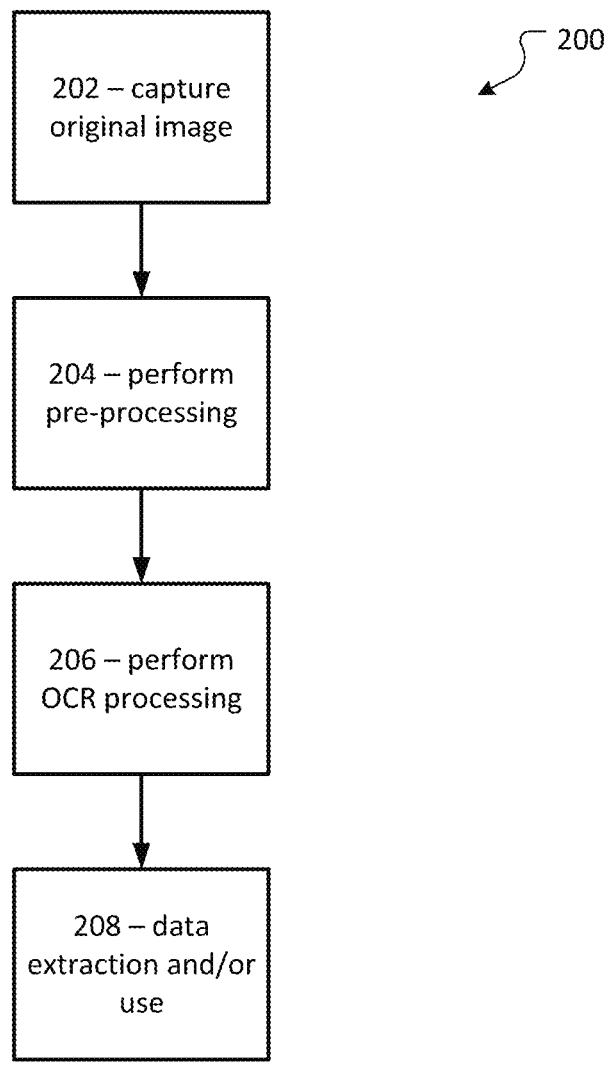
FIG. 2 shows an example text capture process according to an embodiment of the present disclosure.

FIG. 2 shows an example text capture process 200 according to an embodiment of the present disclosure. Process 200 may be performed within system 100 to capture information from document 110, for example. At 202, sensor 114 may capture an original image of document 110. For example, sensor 114 may be a camera that may capture the image in response to a user command and/or through automated processing triggered by a process being performed by a program executed by user device 112. Captured images may include noisy content, papers not aligned to the camera, and/or skewed documents and text. At 204, user device 112 and/or server device 102 may perform pre-processing on the image, for example to improve the accuracy of the eventual text extraction. Pre-processing may include removing background noise, correction of the orientation of the source paper, removal of the background lighting or shadows depicted in the image, etc. At 206, user device 112 and/or server device 102 may perform OCR processing to extract text found in the image. At 208, user device 112 and/or server device 102 may find relevant information, categorize and extract information, and/or perform other processing on information generated by the OCR processing. The disclosed embodiments related to pre-processing and/or OCR enhancements may be performed within the context of process 200, as described in detail below.

Figure 3:
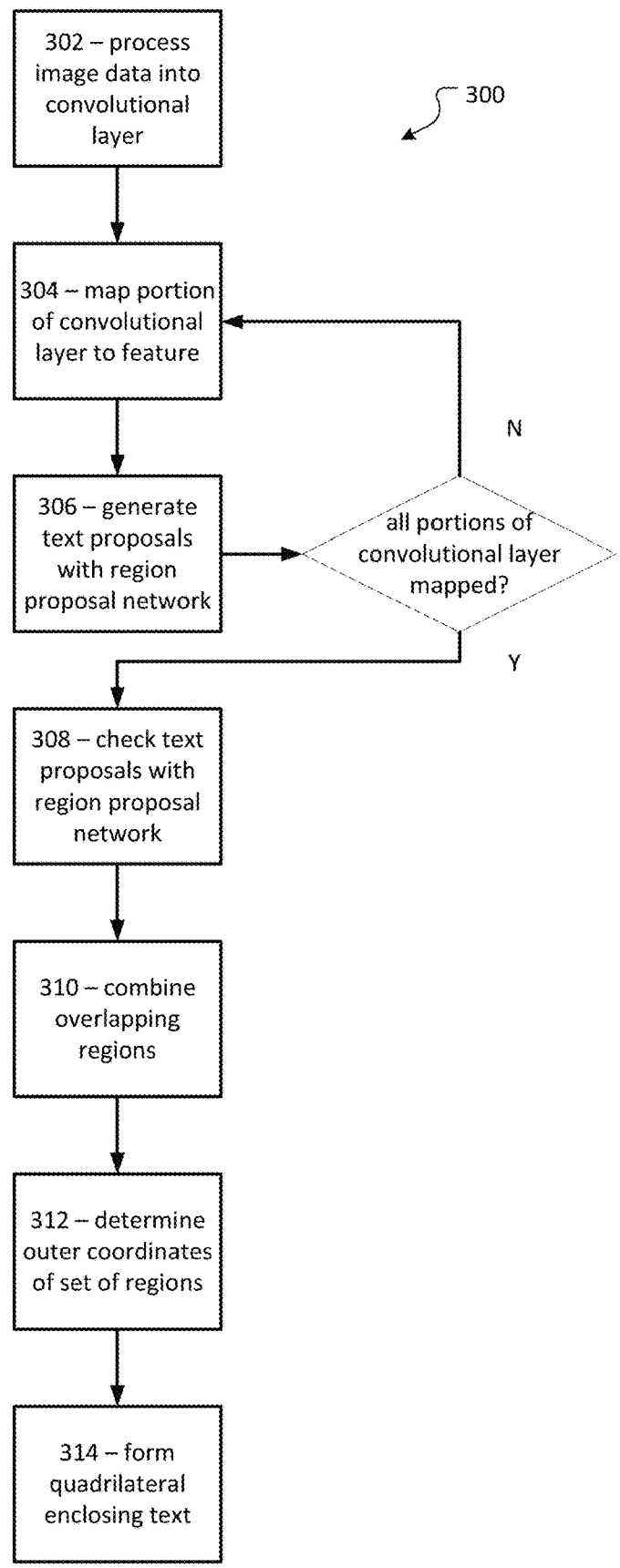
FIG. 3 shows an example pre-processing process using one or more region proposal networks according to an embodiment of the present disclosure.

FIG. 3 shows an example pre-processing process 300 using one or more RPNs according to an embodiment of the present disclosure. Process 300 may form some or all of the pre-processing performed at 204 in process 200. User device 112 and/or server device 102 may perform process 300 to find a tight crop around a portion of the image that includes text. The cropped image eventually may be used for training a supervised keypoint detection network and/or for image analysis, as described in detail below. Process 300 may be regarded as a method of transforming arbitrary image data into data suitable for OCR processing.

To summarize, process 300 may first involve finding the bounding boxes around all the words in a document image by using a pre-trained model to generate regions of interest (ROI) or region proposals in each image. In the context of text extraction, a ROI may be a location that contains text in an image. There may be different approaches to generate region proposals, from adopting a brute-force region generation to using more complex features extracted from an image (e.g., by using deep neural network models) to generate features. Some visual features may be extracted for each of the bounding boxes, and the visual features may be evaluated to determine whether and which objects are present in the proposals. Overlapping boxes may then be combined into a single bounding box for use in the training.

In the example process 300 of FIG. 3, ROIs may be found using RPNs. RPNs may be configured to efficiently predict region proposals with a wide range of scales and aspect ratios. In some embodiments, RPNs may be used within an application of a faster region-based convolutional neural network (Faster R-CNN) architecture to decide where to look for text within an image in order to reduce the computational requirements of the overall text inference process. For example, a Faster-R CNN architecture may include at least the RPN for generating region proposals and one or more other networks or algorithms for detecting objects such as text within the region proposals. Note that while a Faster-R CNN approach is described herein as an example, the RPN may be employed within the applications of other architectures, such as Cascade Region proposal network And FasT r-cnn (CRAFT) or the like. The RPN may quickly and efficiently scan every location in an image in order to assess whether further processing needs to be carried out in a given region. The output of a RPN may include one or more boxes/proposals that may be examined by a classifier and regressor to identify the occurrence of objects. For example, RPN may predict the possibility of an anchor being background or foreground, and refine the anchor, as described in detail below.

At 302, user device 112 and/or server device 102 may process image data into a convolutional layer. Convolutional neural networks (CNNs) such as Faster-R CNN or CRAFT may, as a standard feature, produce a convolutional layer from input data. CNN may process data as a sequence of layers, wherein every layer of a CNN transforms one volume of activations to another through a differentiable function. The convolutional layer may compute the output of neurons that are connected to local regions in the input, computing for each neuron a dot product between its weight and a small region it is connected to in the input volume. This may result in a volume such as [n×n×12], for an n*n image if 12 filters are applied, for example.

Figure 4A:
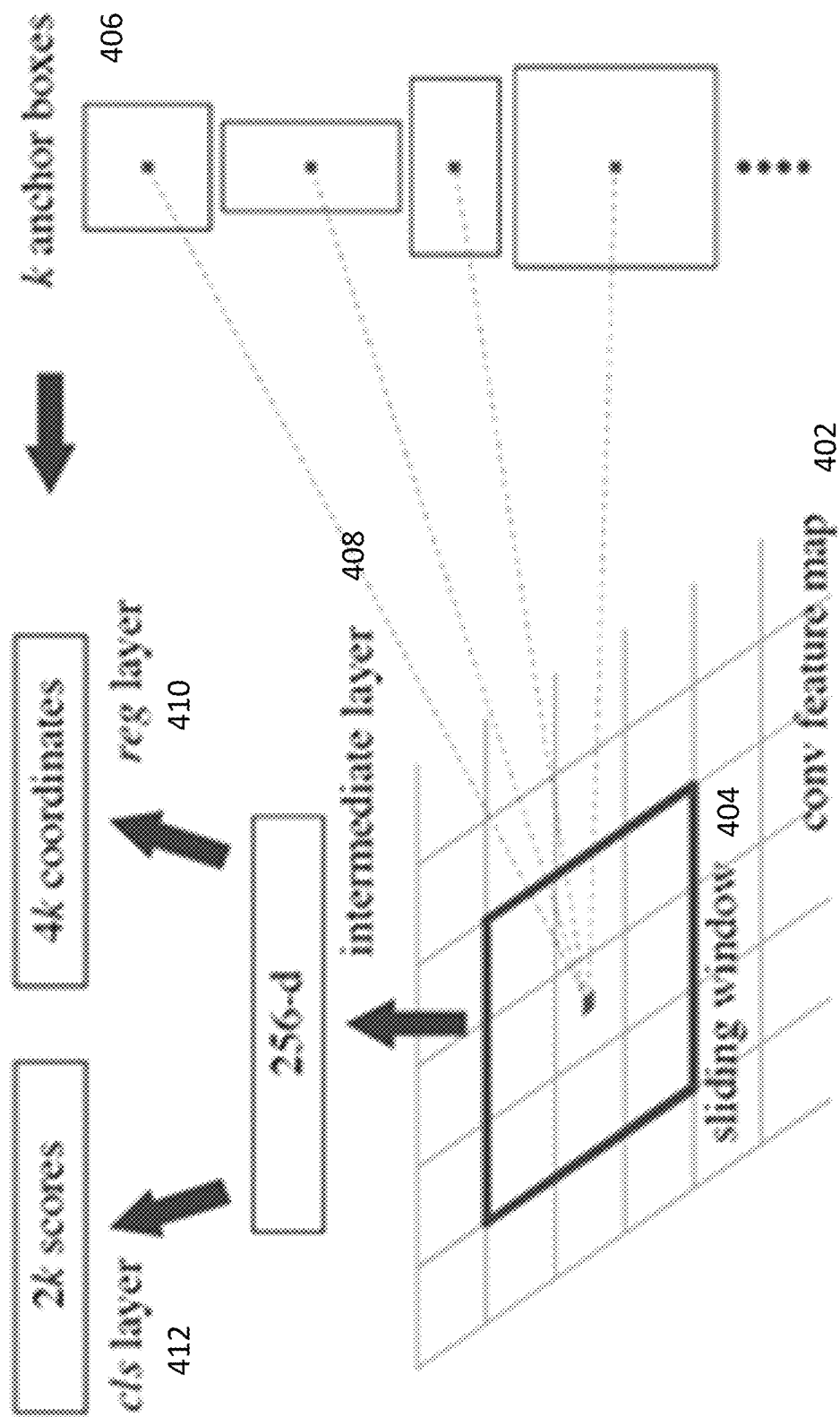
FIGS. 4A-4C show representations of portions of the process of FIG. 3 according to an embodiment of the present disclosure.
Figure 4B:
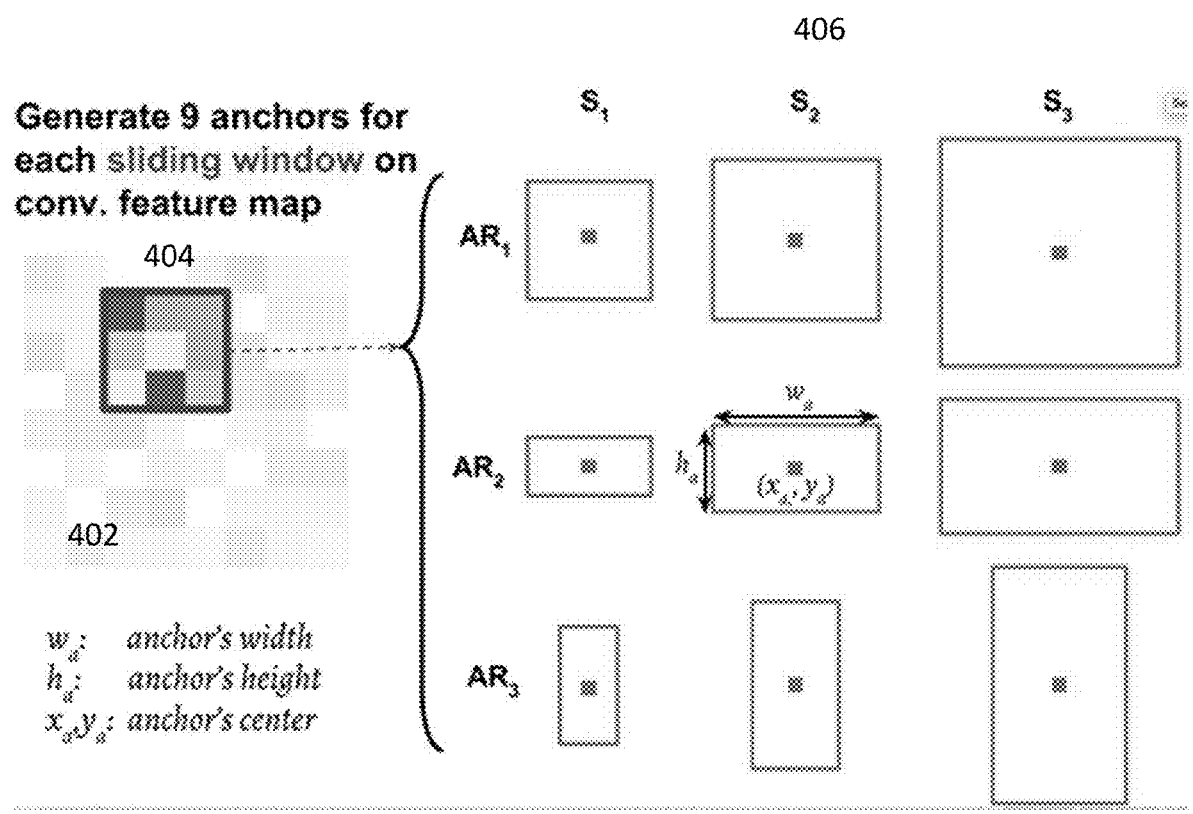
Figure 4C:
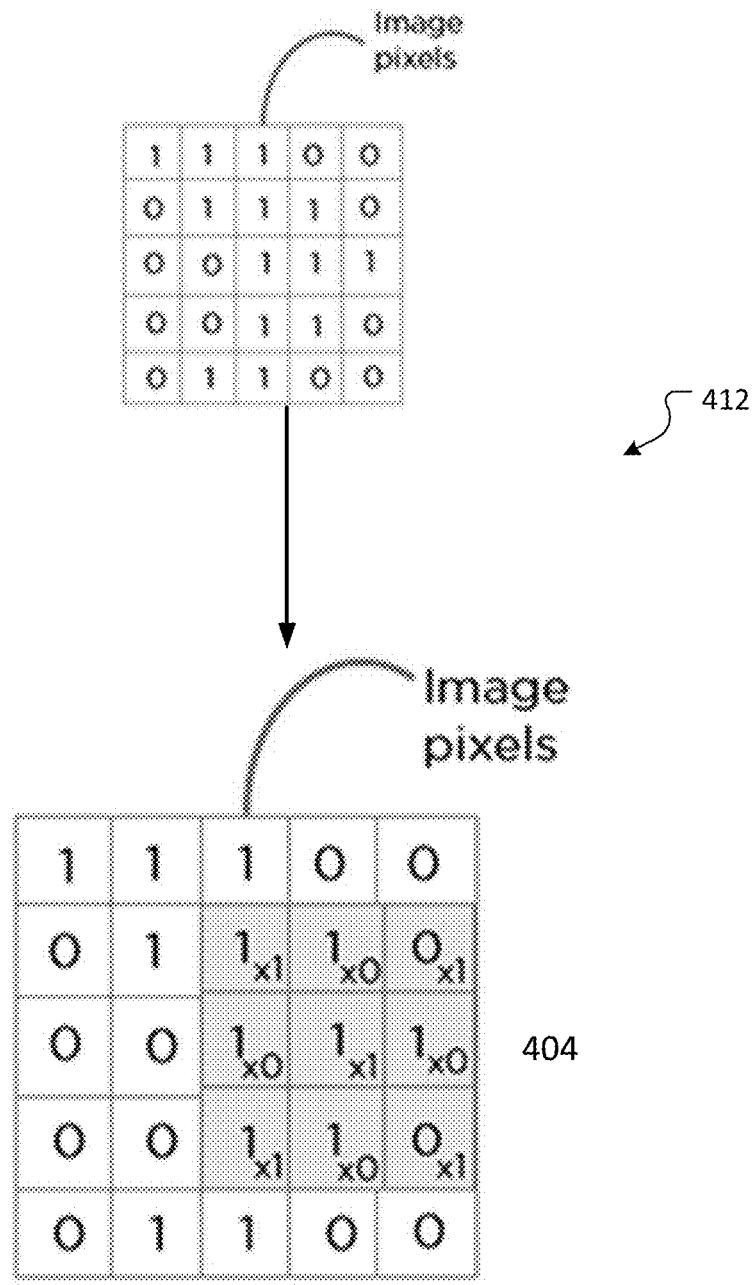

At 304, user device 112 and/or server device 102 may map a portion of the convolutional layer to an intermediate feature. To generate region proposals, a small network may be slid over the convolutional feature map output at 302. This small network may take as input an n×n spatial window of the input convolutional feature map. FIGS. 4A-4C show representations of portions of the process of FIG. 3 according to an embodiment of the present disclosure. In FIG. 4A, sliding window 404 captures a portion of convolutional feature map 402. The captured portion may be mapped to a lower-dimensional intermediate feature layer 408. As shown in FIG. 4B, sliding window 404 may be run spatially on these feature maps. The size of sliding window 404 may be n×n (here 3×3). For each sliding window 404 of size 3×3, for example, a set of 9 anchors 406 may be generated. Each anchor 406 may have a same center ($x_a$, $y_a$), but with three different aspect ratios and three different scales among the anchors 406 as shown. FIG. 4C shows an example of the convolution operation 412 performed over the input array, where sliding window 404 includes a filter matrix that computes the convolution operation.

Figure 5A:
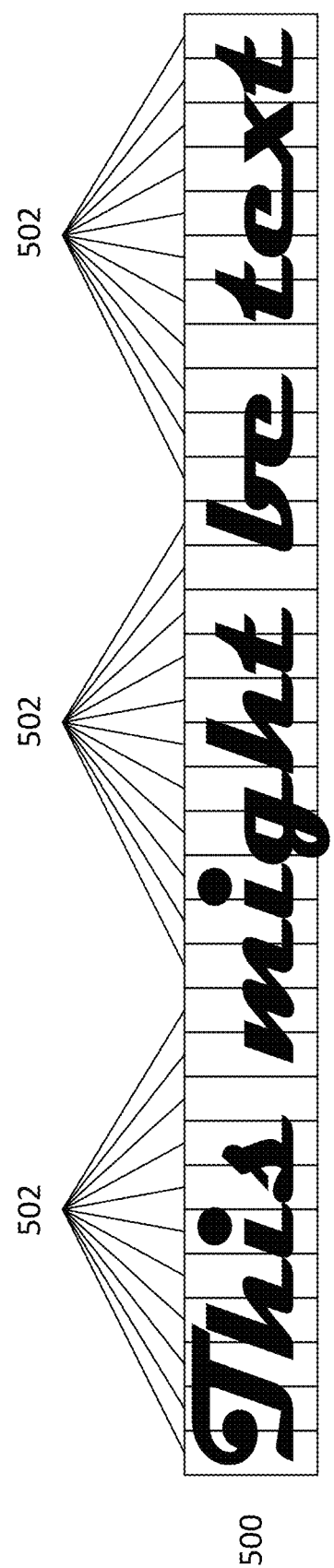
FIG. 5A shows a text sample that has been processed by a region proposal network according to an embodiment of the present disclosure.

Returning to FIG. 3, at 306, user device 112 and/or server device 102 may generate text proposals for text found within the intermediate feature layer 408 obtained at 304. For example, as shown in FIG. 4A, the intermediate feature layer 408 may be fed into two sibling fully-connected layers, a box-regression layer (reg) 410 and a box-classification layer (cls) 412. The output of reg may be a predicted bounding box, which may be fed to cls. The output of cls may be a probability indicating whether the predicted bounding box includes text. These RPNs may have been originally used for object detection and may have been trained on object datasets such as PASCAL VOC and Microsoft COCO. However, in the embodiments described herein, the RPNs may be used for text understanding that accurately localizes text lines in a natural image. For example, RPNs have been tested on natural scene images of billboards, street signs, news headlines, and the like to detect and localize sparse text in such images. The disclosed embodiments may be applied to any images, including images of receipts or other documents. This may be possible because bounding boxes of detected text may be directly extracted from the segmentation result, without performing location regression. FIG. 5A shows a text sample 500 that has been processed by an RPN according to an embodiment of the present disclosure. The text 500 may be detected by densely sliding a small window in the convolutional feature maps as described above, and the output may be a sequence of fine-scale (e.g., fixed 16-pixel width) text proposals 502.

Returning to FIG. 3, processing at 304 and 306 may repeat until the entire image (or a portion thereof designated to be scanned) has been scanned by the small network.

At 308, user device 112 and/or server device 102 may process text proposals 502 generated at 306 with the RPN to determine areas of text and non-text within text proposals 502. For example, in some embodiments, each text proposal 502 may be fed to an RPN, such as those described above, which may provide a preliminary result of whether the text proposal 502 includes text or does not include text. Text proposals 502 that do not include text may be disregarded in subsequent processing steps, for example.

Figure 5B:
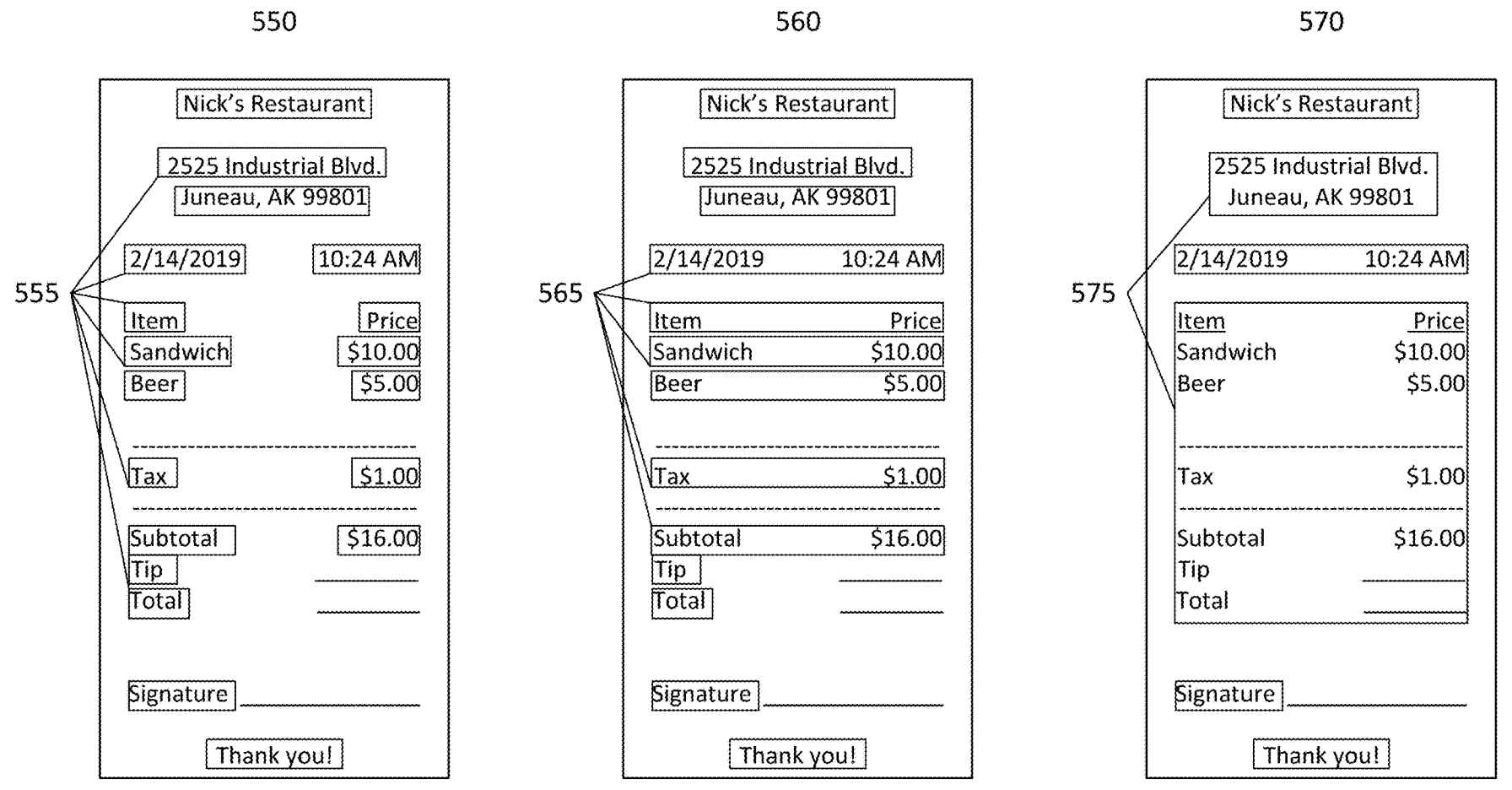

At 310, user device 112 and/or server device 102 may combine overlapping regions of continuous text proposals into fewer, larger regions. For example, FIG. 5B shows a merger of text regions according to an embodiment of the present disclosure. First, an image of a receipt 550 may include originally detected boxes 555 after processing at 304-308. User device 112 and/or server device 102 may sort originally detected boxes 555 according to their (x,y) coordinates and perform an initial grouping in image 560, with horizontally merged boxes 565. For example, originally detected boxes 555 that are aligned with one another in a horizontal (e.g., y) direction may be merged into horizontally merged boxes 565. Next, horizontally merged boxes 565 may be merged in a vertical (e.g., x) direction in image 570, and any overlapping merged boxes (e.g., boxes sharing at least one common x, y coordinate) may be merged together to form final patches 575.

Returning to FIG. 3, at 312, user device 112 and/or server device 102 may determine the outer coordinates of the final patch of all regions that remain after combination at 310. For example, each region may be defined by its coordinates within the image. To determine the outer coordinates, user device 112 and/or server device 102 may select the leftmost, rightmost, topmost, and bottommost coordinates from among all regions.

At 314, user device 112 and/or server device 102 may form a quadrilateral enclosing all text identified through processing at 304-308. For example, the quadrilateral may be a smallest quadrilateral that has the leftmost, rightmost, topmost, and bottommost coordinates identified at 312 within its border. The quadrilateral may define and/or include a portion of the image which it encloses in some cases, or the quadrilateral may be cropped to form a new image having the quadrilateral as its border or being a smallest image that encloses the entire quadrilateral within its border. In some embodiments, this quadrilateral may be subjected to subsequent processing, described below, that may ultimately extract text within the quadrilateral using OCR. For example, text may be processed using OCR and/or other techniques described below with respect to FIGS. 8-10C. In some embodiments, this quadrilateral may be used as training data to train machine learning models that may be used to find corners in skewed or otherwise deformed documents in an image. For example, process 300 may be repeated for multiple images (e.g., hundreds or thousands or images) to build a training set. In other embodiments, as described below, the quadrilateral may be fed to an already trained model that may be used to analyze the text within the quadrilateral.

Based on models trained by the training set created using process 300, other images may be pre-processed to enhance OCR effectiveness. In some embodiments, this may include receiving a pixelated image of a document of an original size, downscaling the received pixelated image, employing a neural network algorithm to the downscaled image to identify four corners of the paper document in the received pixelated image, re-enlarging the downscaled image to the original size, identifying each of four corners of the paper document in the pixelated image, determining a quadrilateral composed of lines that intersect at four angles at the four corners of the paper document in the pixelated image, defining a projective plane of the pixelated image, and determining an inverse transformation of the pixelated image to transform the projective plane quadrilateral into a right angled rectangle.

Figure 6:
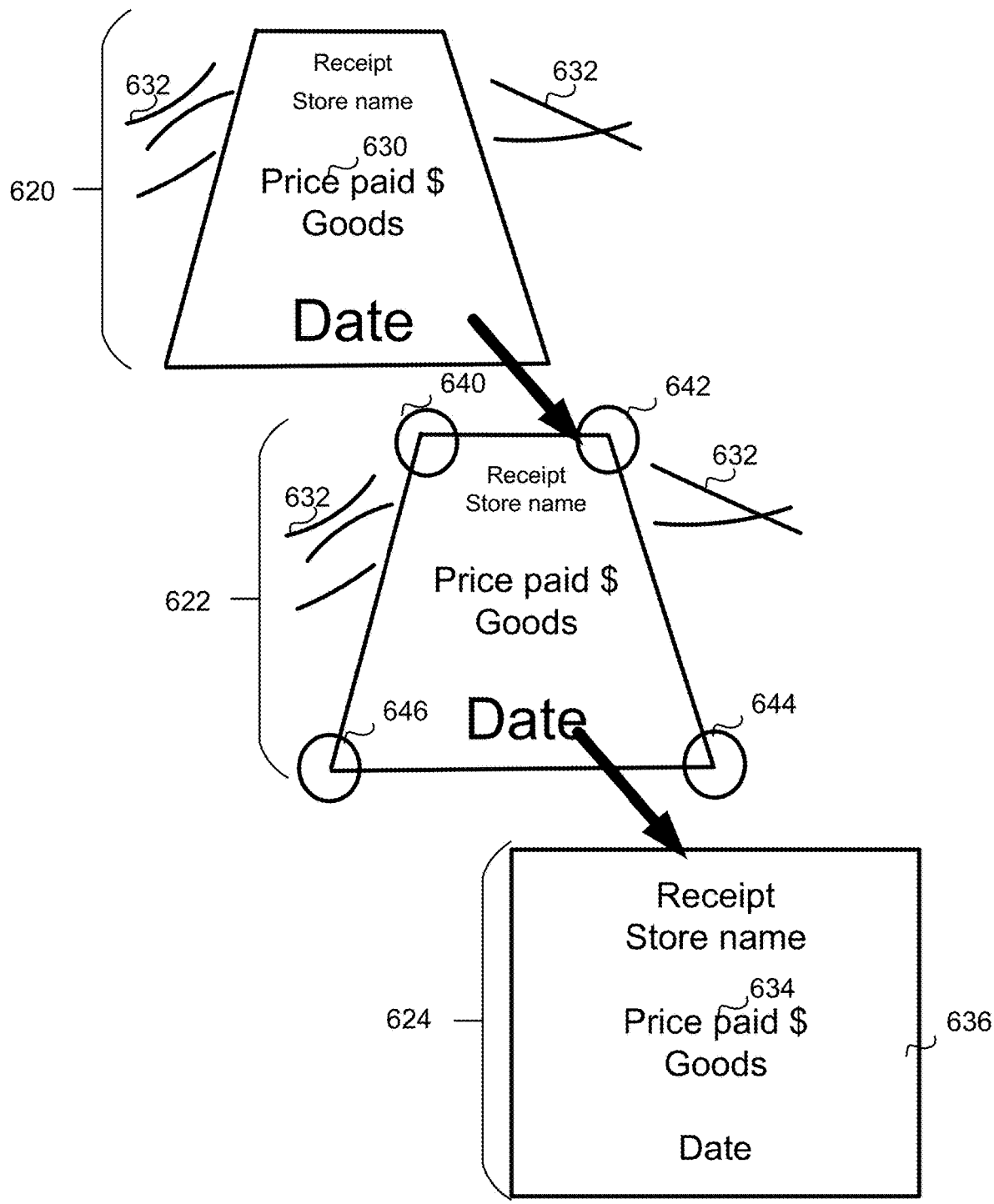
FIG. 6 shows corner point identification and perspective transformation examples according to an embodiment of the present disclosure.

FIG. 6 shows corner point identification and perspective transformation examples according to an embodiment of the present disclosure. FIG. 6 shows one image of a paper receipt. In the example, the receipt in the image that is received 620 has a skewed perspective from the angle the original image was captured. The image also includes background noise 632 from the table the receipt was sitting on when the image was taken. As received, the text of the receipt 630 may be difficult to process by an OCR system and may be confused by the background clutter.

Using the methods described herein, the four corners 640, 642, 344, 646 of the receipt in the image 622 may be identified. In some example embodiments, the four corners may be identified using machine learning/neural networks which have been trained to find such corners. In other embodiments, the four corners may be identified through process 300 (e.g., as the leftmost, rightmost, topmost, and bottommost coordinates of the quadrilateral). After the corners are identified, the image may be de-skewed to correct any misalignment of the text 634 in the document. Additionally or alternatively, after the corners are identified, everything outside the rectangle 624 may be cropped to remove the background noise 632. Such a resultant pixelated or digitized image 624 with the text aligned and the background removed may be more accurately processed using OCR than the first image 620.

Figure 7:
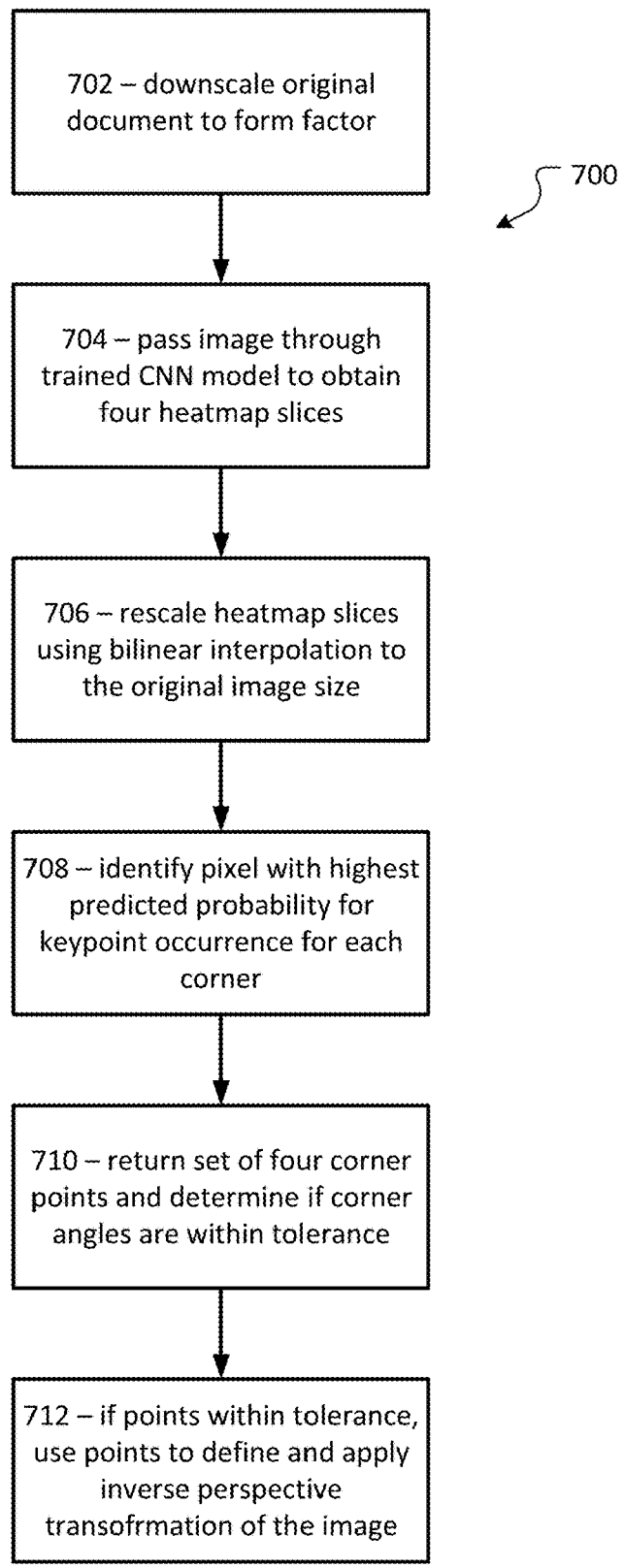
FIG. 7 shows an example corner point identification and perspective transformation process according to an embodiment of the present disclosure.

FIG. 7 shows an example corner point identification and perspective transformation process 700 according to an embodiment of the present disclosure. Process 700 may form some or all of the pre-processing performed at 204 in process 200. User device 112 and/or server device 102 may perform process 700 to crop and/or de-skew an image to make it more suitable for OCR processing. In some embodiments, corner point identification and perspective transformation used by system 100 may be of the type described in U.S. patent application Ser. No. 16/265,524, entitled "Supervised Machine Learning Algorithm Application for Image Cropping and Skew Rectification," filed Feb. 1, 2019, and incorporated herein by reference in its entirety.

At 702, user device 112 and/or server device 102 may receive and downscale an image to be cropped and/or de-skewed. In some examples, the image may be received from a mobile client or smartphone camera image capture. In some examples, the downscale may be a reduction in pixels by grouping individual pixels to be processed in blocks. This downscale may reduce the number of pixels to be processed and thereby increase computing efficiency, reduce the time to process images, and/or free up compute resources for other tasks.

At 704, user device 112 and/or server device 102 may pass the image through a neural network model to obtain four heat map slices. This process may utilize neural networks which are trained to identify the four corners of a portion of an image that includes text. For example, the neural network used at 704 may have been trained on outputs of process 300 as described above. In some embodiments, the neural network may be a CNN such as a stacked hourglass neural network or other CNN. CNNs are described in greater detail below. The four heat maps may identify the approximate locations of the four corners of the portion of the image that includes text, as shown in FIG. 3A at 340, 342, 344, and 346, for example.

At 706, user device 112 and/or server device 102 may rescale the heat map slices obtained at 704. In some examples, this rescaling may include applying bilinear interpolation to obtain the original size of the image.

At 708, user device 112 and/or server device 102 may identify, for each of the four corners, a respective pixel with the highest predicted probability of a keypoint occurrence. For example, within each of the four heat maps, user device 112 and/or server device 102 may identify the point of highest probability in the respective heatmap for the respective corner point.

At 710, user device 112 and/or server device 102 may identify the four corner points from the four pixels identified at 708 and may determine whether lines that connect the corners create angles that fall within a pre-determined tolerance. That is, if lines are drawn between the four points, do the line intersections create angles that fall within a tolerance around a ninety degree right angle?

At 712, if the lines fall within the tolerance based on the evaluation performed at 710, user device 112 and/or server device 102 may use those corner determinations to define a quadrilateral and projective plane from which an inverse transformation of the image may be made in order to de-skew the image. If the lines fall outside the tolerance, the original image may be returned. In some examples, user device 112 and/or server device 102 may crop out any background, located outside the quadrilateral formed by connecting the corners, to remove any background noise or images.

In some example methods described herein, a neural network may be used to create the corner heat maps, and thereby identify the four corners of the document in the image. As noted above, such a neural network may be a stacked hourglass neural network arrangement. In the application described herein, the CNN may be trained to identify the four corners of a document in an image analysis. In such an arrangement, the system 100 may capture and consolidate information across all scales of any given image. This may include first, pooling down the image to a low resolution, then, up-sampling the image to combine features across multiple resolutions. In some examples, multiple hourglass modules may be used back-to-back to allow for repeated bottoms-up, top-down inference across scales. This may utilize a single pipeline with skip layers to preserve spatial information at each resolution and convolution and max pooling layers to process image features down to a low resolution. For each max pooling step, the CNN may branch off and apply more convolutions at the original pre-pooled resolution, so at the lowest resolution, the network begins the top-down sequence of up-sampling and combination of features across scales. Nearest neighbor up-sampling of the lower resolution followed by an elementwise addition of the two sets of features, may be used to bring together information across two adjacent resolutions, thus, for every layer on the way down for downscaling, there is a corresponding layer on the way up for up-sampling. At the output resolution, two consecutive rounds of 1×1 convolutions may be applied to produce the final network predictions. The result may be heat maps of the approximate locations of four corners of the paper document as described. Used with immediate supervision, repeated bidirectional inference may be used for increasing the network's performance.

As described, such a neural network may be trained by introducing iterative examples to identify the four document corners in an image as an upper left, an upper right, a lower left, and lower right corner. These examples may be derived by process 300, as discussed above. The outputs of process 300 may be fed into the CNN model. For example, training may include using multiple images, for example many thousands of images that are annotated to include location of the four corner points by process 300.

After the CNN model is trained, a new image may be fed into the model to find the corners. In some embodiments, at runtime, the resized document may be 256×256. The corners may be identified in the trained stacked-hourglass network. As discussed, the result of such analysis may be four different heat maps that project a probability of the location of each of the four corners. The image may be resized, the resultant point heat map may be resized to the original size image, and maximum values may be found to identify the corner point locations. Then, a quadrilateral may be formed by connecting the corners, after which, a measurement of the mean vertical and horizontal lengths from the quadrilateral may be made, as defined by the points, to make a projective transformation to transform the quadrilateral into a proper rectangle where the vertical and horizontal dimensions may be previously calculated. That is, the de-skewed image may result in a rectangular shaped representation of the paper document, with right angled corners and the resultant text de-skewed.

Figure 8:
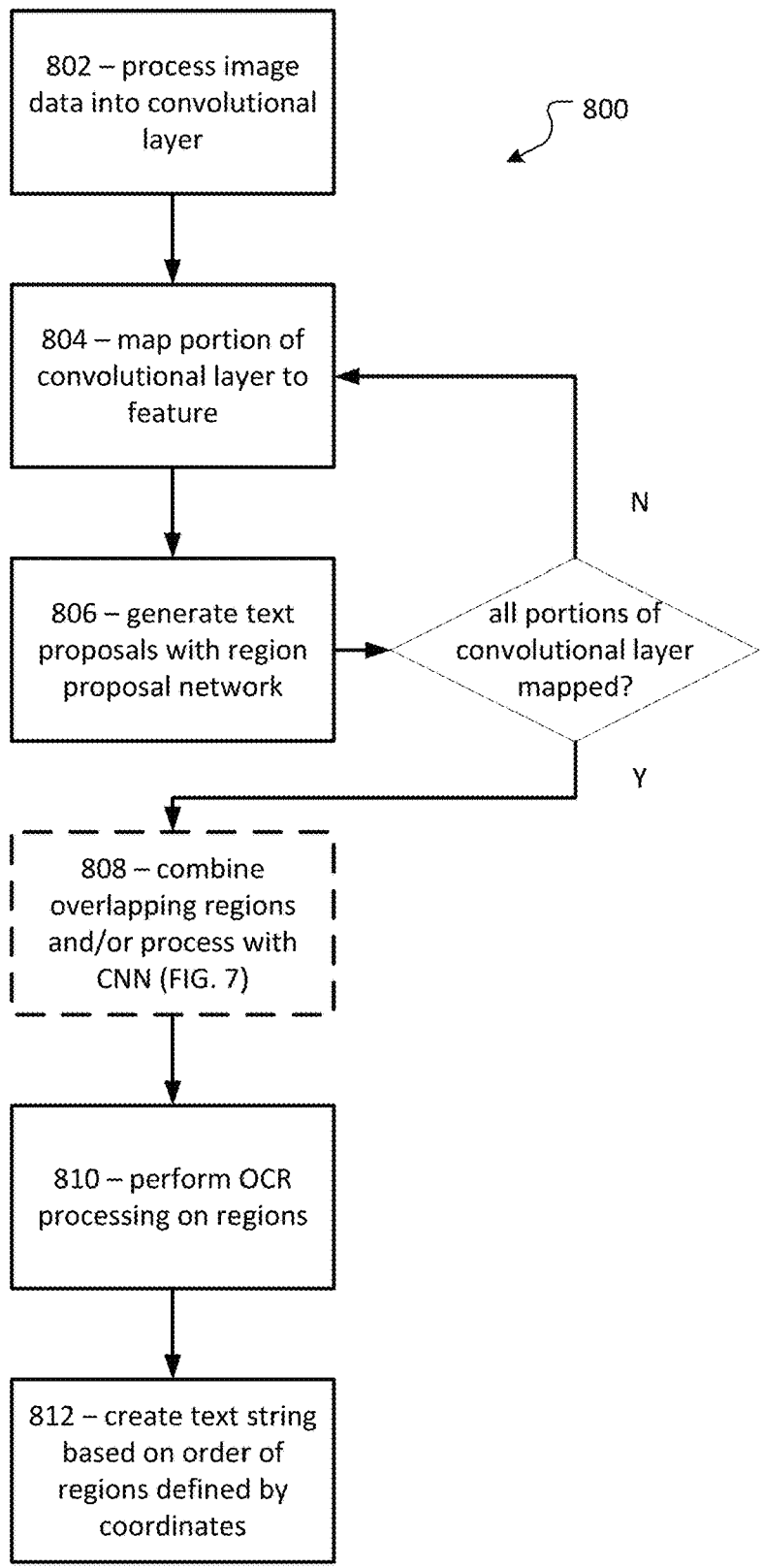
FIG. 8 shows an example pre-processing and text string generation process using one or more region proposal networks according to an embodiment of the present disclosure.

In some embodiments, pre-processing may be performed for reasons other than edge detection training. For example, pre-processing may be performed to identify text strings for further processing using OCR and/or other techniques. FIG. 8 shows an example pre-processing and text string generation process 800 using one or more RPNs according to an embodiment of the present disclosure. Process 800 may form some or all of the pre-processing and/or OCR processing performed at 204 and/or 206 in process 200. User device 112 and/or server device 102 may perform process 800 to find text regions and, from those text regions, text strings that may be further processed as described in detail below and/or in other ways.

To summarize, process 800 may first involve finding the bounding boxes around all the words in a document image by using a pre-trained model to generate ROIs or region proposals in each image. ROIs may be combined and processed to generate one or more text strings.

In the example process 800 of FIG. 8, ROIs may be found using RPNs. RPNs may be configured to efficiently predict region proposals with a wide range of scales and aspect ratios. RPNs may be applied to a faster region-based convolutional neural network (Faster R-CNN) to decide where to look for text within an image in order to reduce the computational requirements of the overall text inference process. For example, a Faster-R CNN architecture may include at least the RPN for generating region proposals and one or more other networks or algorithms for detecting objects such as text within the region proposals. Note that while a Faster-R CNN approach is described herein as an example, the RPN may be employed within the applications of other architectures, such as Cascade Region proposal network And FasT r-cnn (CRAFT) or the like. The RPN may quickly and efficiently scan every location in an image in order to assess whether further processing needs to be carried out in a given region. The output of a RPN may include one or more boxes/proposals that may be examined by a classifier and regressor to identify the occurrence of objects. For example, RPN may predict the possibility of an anchor being background or foreground, and refine the anchor, as described in detail below.

At 802, user device 112 and/or server device 102 may process image data into a convolutional layer. Convolutional neural networks (CNNs) such as Faster-R CNN or CRAFT may, as a standard feature, produce a convolutional layer from input data. CNN may process data as a sequence of layers, wherein every layer of a CNN transforms one volume of activations to another through a differentiable function. The convolutional layer may compute the output of neurons that are connected to local regions in the input, computing for each neuron a dot product between its weight and a small region it is connected to in the input volume. This may result in a volume such as [n×n×12], for an n*n image if 12 filters are applied, for example.

At 804, user device 112 and/or server device 102 may map a portion of the convolutional layer to an intermediate feature. To generate region proposals, a small network may be slid over the convolutional feature map output at 804. This small network may take as input an n×n spatial window of the input convolutional feature map. FIGS. 4A-4C, described above, may also apply to the process 800 of FIG. 8. For example, in FIG. 4A, sliding window 404 captures a portion of convolutional feature map 402. The captured portion may be mapped to a lower-dimensional intermediate feature layer 408. As shown in FIG. 4B, sliding window 404 may be run spatially on these feature maps. The size of sliding window 404 may be n×n (here 3×3). For each sliding window 404 of size 3×3, for example, a set of 9 anchors 406 may be generated. Each anchor 406 may have a same center $(x_a, y_a)$, but with three different aspect ratios and three different scales among the anchors 406 as shown. FIG. 4C shows an example of the convolution operation 412 performed over the input array, where sliding window 404 includes a filter matrix that computes the convolution operation.

Returning to FIG. 8, at 806, user device 112 and/or server device 102 may generate text proposals for text found within the intermediate feature layer 408 obtained at 804. For example, as shown in FIG. 4A, the intermediate feature layer 408 may be fed into two sibling fully-connected layers, a box-regression layer (reg) 410 and a box-classification layer (cls) 412. The output of reg may be a predicted bounding box, which may be fed to cls. The output of cls may be a probability indicating whether the predicted bounding box includes text. These RPNs may have been originally used for object detection and may have been trained on object datasets such as PASCAL VOC and Microsoft COCO. However, in the embodiments described herein, the RPNs may be used for text understanding that accurately localizes text lines in a natural image. For example, RPNs have been tested on natural scene images of billboards, street signs, news headlines, and the like to detect and localize sparse text in such images. The disclosed embodiments may be applied to any images, including images of receipts or other documents. This may be possible because bounding boxes of detected text may be directly extracted from the segmentation result, without performing location regression. FIG. 5A shows a text sample 500 that has been processed by an RPN according to an embodiment of the present disclosure. The text 500 may be detected by densely sliding a small window in the convolutional feature maps as described above, and the output may be a sequence of fine-scale (e.g., fixed 16-pixel width) text proposals 502.

Returning to FIG. 8, processing at 804 and 806 may repeat until the entire image (or a portion thereof designated to be scanned) has been scanned by the small network.

At 808, in some embodiments, user device 112 and/or server device 102 may perform additional pre-processing before OCR processing. For example, pre-processing at 808 may include combining overlapping regions of continuous text proposals into fewer, larger regions. Some experiments have shown that passing groups of words, rather than individual words, to an OCR process may result in more accurate word recognition. Accordingly, at 808, user device 112 and/or server device 102 may combine individual portions of text detected at 806 into larger boxes. For example, FIG. 5B shows a merger of text regions according to an embodiment of the present disclosure. First, an image of a receipt 550 may include originally detected boxes 555 after processing at 804-806. User device 112 and/or server device 102 may sort originally detected boxes 555 according to their (x,y) coordinates and perform an initial grouping in image 560, with horizontally merged boxes 565. For example, originally detected boxes 555 that are aligned with one another in a horizontal (e.g., y) direction may be merged into horizontally merged boxes 565. Next, horizontally merged boxes 565 may be merged in a vertical (e.g., x) direction in image 570, and any overlapping merged boxes (e.g., boxes sharing at least one common x, y coordinate) may be merged together to form final patches 575.

In addition to and/or instead of the combining, pre-processing at 808 may include performing the corner point identification and perspective transformation process 700 described above with respect to FIG. 7 to crop and/or de-skew the image data.

In some embodiments, pre-processing at 808 may be omitted, and the text detected at 806 may be passed directly to the OCR process.

Returning to FIG. 8, at 810, user device 112 and/or server device 102 may perform OCR on the pre-processed data from 806 or 808. For example, text and/or boxes of text may be sent to OCR to read the digitized text.

At 812, user device 112 and/or server device 102 may create at least one text string from the results of OCR processing at 810. For example, associated with the processing at 808, for example, user device 112 and/or server device 102 may have metadata defining the coordinates of each box of text submitted to the OCR at 810. This metadata may be associated with corresponding results of OCR processing, such that each recognized text result from OCR may be associated with coordinates of the image from which it originated. Accordingly, user device 112 and/or server device 102 may arrange the outputs of the OCR processing from left to right and top to bottom within the image to produce an ordered set of text arranged in the same order as the document depicted within the image. The resulting set of text may be further processed for data extraction and/or use (e.g., at 208 of process 200), as described in detail below.

Examples of further processing may include end-to-end data extraction for various types of documents, such as receipt data extraction for insertion into expense reports or other types of document data extraction. This may include the use of natural language processing (NLP) to process the text and extract desired information from document images.

Figure 9:
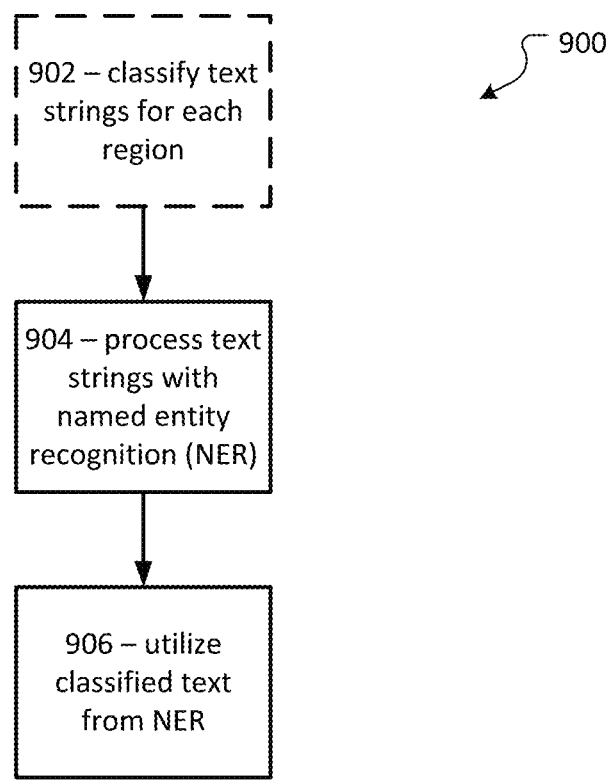
FIG. 9 shows an example data extraction process according to an embodiment of the present disclosure.

FIG. 9 shows an example data extraction process 900 according to an embodiment of the present disclosure. Data extraction process 900 may determine meaning of text recognized by OCR (e.g., obtained as described above or through other OCR techniques). For example, process 900 may use one or more NLP techniques to process the text and extract desired information from document images.

To summarize, process 900 may obtain ordered text (e.g., from process 800) and, in some embodiments, may perform preliminary classification of the text. Then, process 900 may employ named entity recognition (NER) technique to process the text, learn features of the text from the processing, and categorize each word (token) to at least one of a plurality of predefined classes. NER is a technique that may locate and classify named entities in text into predefined categories such as the names of persons, organizations, locations, monetary values, etc. For example, in a receipt processing case, the predefined classes may include, but are not limited to, "vendor name," "total amount," "last 4 digits of credit card," "transaction date," and "other." Once classified, the data may be used by other applications. For example, in the receipt processing case, the data corresponding to the predefined classes may be entered into a form for reimbursement processing or reporting.

At 902, in some embodiments, user device 112 and/or server device 102 may receive text strings for regions of an image (e.g., outputs of process 800) and may classify the text strings. In some embodiments, classification at 902 may only be performed on documents below a threshold size (e.g., when a total amount of text is below some threshold value, such as a number of strings below a threshold string value or a number of words below a threshold word value). Accordingly, user device 112 and/or server device 102 may first compare the size of the text to the threshold to determine whether to preform classification.

For cases wherein classification is performed, some embodiments of classification may proceed as follows. User device 112 and/or server device 102 may extract some features from the text as described above and use a classifier (e.g., a machine learning classifier such as random forest, linear regression, support vector machine, logistic regression, etc.) to preliminarily classify the extracted features. For example, extracted features may be positively classified into one or more of the predefined classes (e.g., "vendor name," "total amount," "last 4 digits of credit card," "transaction date," and "other"). Features may include, but are not limited to, character uni, bi, tri gram, whether that block some specific words (e.g., "credit card," "debit," "total"), whether that block includes digits, whether that block includes one or more regular expression patterns, relative coordinates of the patch, etc. Classification at this stage may allow NER processing to ingest less of the total text, thereby improving overall speed and efficiency of process 900.

At 904, user device 112 and/or server device 102 may process text strings using NER to classify the text. In at least some embodiments wherein some of the text is classified at 902, user device 112 and/or server device 102 may only process unclassified portions of the text at this stage.

NER may extract different types of features from OCRed text. There may be two categories of features in many NER embodiments, token-based and contextual. The first category may include token (individual word) features, which may capture a word's morphological pattern and entity type. For example, some embodiments may use the suffix, prefix, length, and pattern of a current token to give evidence of a particular word being a part of a named entity. Some embodiments may use part-of-speech (POS) tags as a shallow parsing technique. The second category may include contextual features, which may capture syntactic and semantic relations of any word to their neighbors. For example, some embodiments may use word2vec features to learn a compact embedding to capture differences across field value types and/or dynamic topic modeling (DTM) to learn probabilistic distributions of latent topics over words.

NER may apply a trained model to recognize meanings and/or classifications of text. In some embodiments, these trained models may be engineered by human users who define such meanings and/or classifications. However, other embodiments may use deep neural networks to learn information from sequential data. In either case, or using a combination thereof, classified features may include word length, suffixes, prefixes, uni/bi/tri-grams, part of speech, pattern, is/has digits, relative coordinates of bounding box, line/page numbers, Word2Vec embedding, FastText embedding, Glove embedding, Latent Dirichlet Allocation (LDA) topic modeling or other types of topic modeling for discovering one or more abstract topics occurring in one or more documents, etc.

For example, deep neural networks may include a recurrent neural network (RNN), which is a type of network that may process tasks with arbitrary sequences of inputs. RNN has a high-dimensional hidden state with non-linear dynamics that encourage RNNs to take advantage of previous information. RNNs may be used for classifications with short-term dependencies that do not depend on the context of the text, because RNNs may be affected by vanishing gradient issues.

Figure 10A:
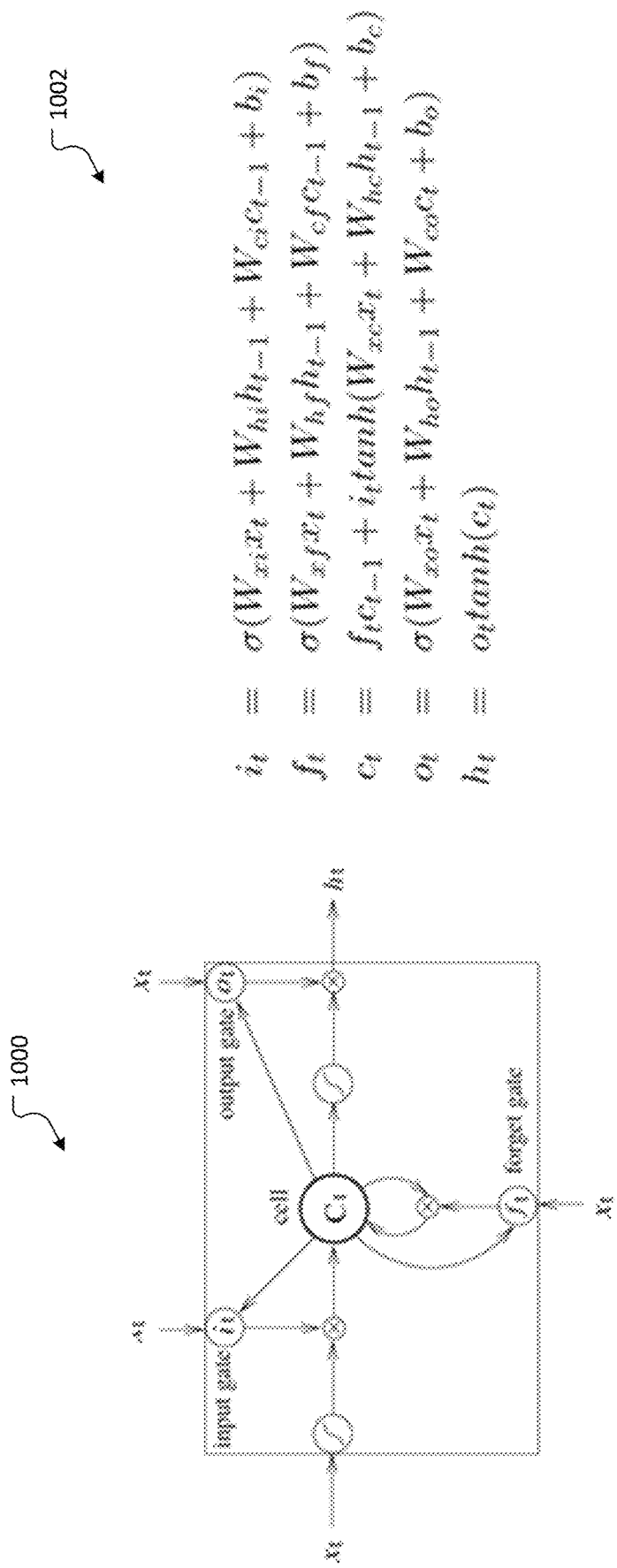
FIG. 10A shows an example long short-term memory cell and related equations according to an embodiment of the present disclosure.

Long short-term memory (LSTM) is a variant of RNN which may be equipped to deal with the gradient vanishing and exploding problems when learning with long-range sequences. LSTM networks are the same as RNN, except that hidden layer updates are replaced by memory cells. Basically, a memory cell unit may include three multiplicative gates that control the proportions of information to forget and to pass on to the next time step. The original LSTM uses only previous contexts for prediction. For many sequence labeling tasks, it may be useful to identify contexts from two directions. Thus, some embodiments may utilize bidirectional LSTM (Bi-LSTM) for both word and character-level systems. FIG. 10A shows an example Bi-LSTM cell 1000 and related equations 1002 according to an embodiment of the present disclosure. In cell 1000 governed by equations 1002 as shown, given a sentence $(x_1, x_2, \ldots, x_n)$, for each character $x_i$, LSTM may be applied to compute the representation $l_i$ of left context for the sentence, and vice versa. Then, a representation $r_i$ of the right context may be obtained by reversing the sentence. Concatenation of the left and right context representations may give the final representations $[l_i, r_i]$ of a character, and this representation may be useful for the tagging system.

Figure 10B:
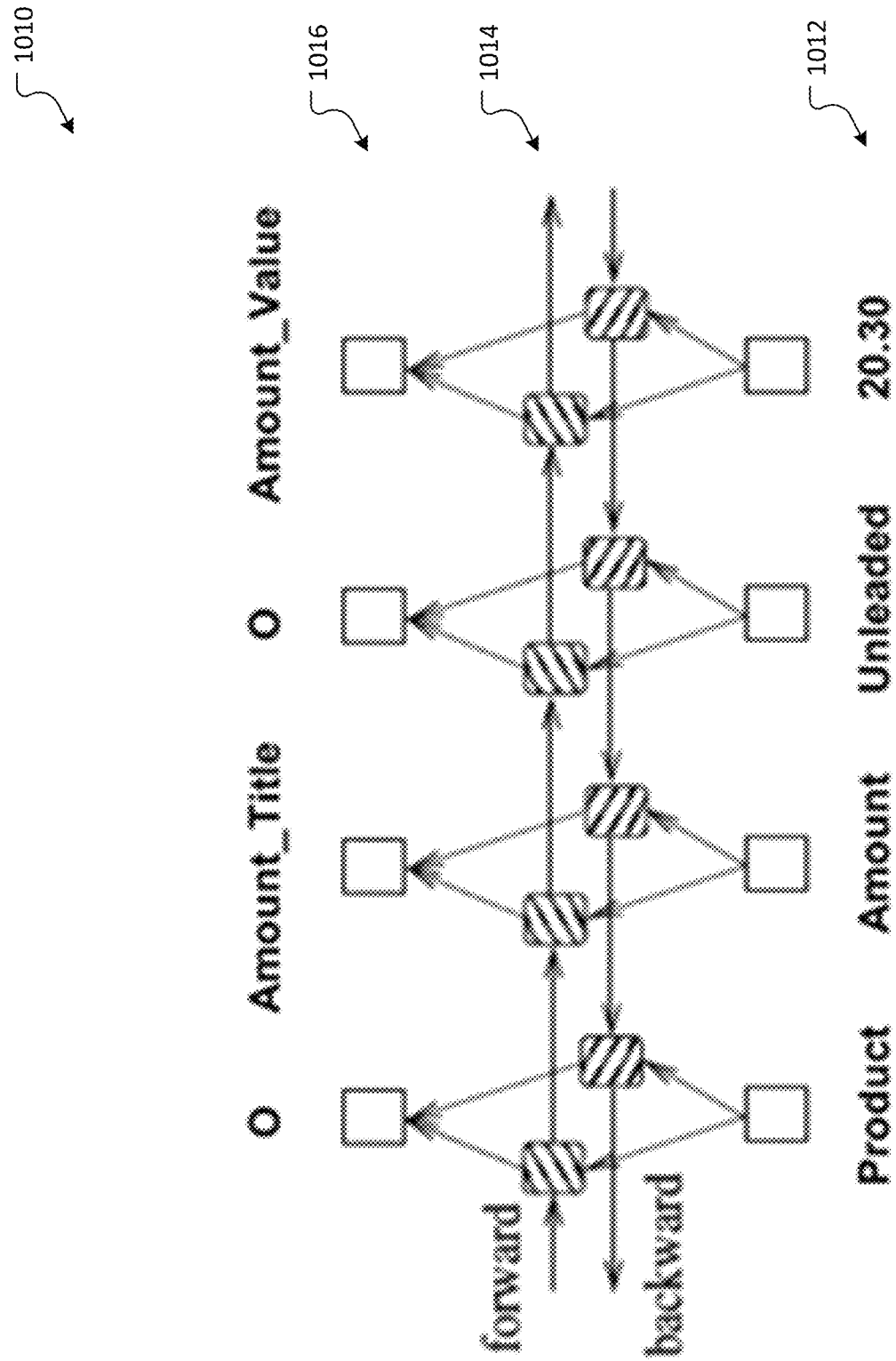
FIG. 10B shows an example bidirectional long short-term memory network applied to a text phrase according to an embodiment of the present disclosure.

FIG. 10B shows an example Bi-LSTM network 1010 applied to a text phrase 1012 according to an embodiment of the present disclosure. One way to make use of neighbor tag information in predicting current tags is to focus on sentence level, instead of individual, positions, thus leading to conditional random fields (CRF) models. CRFs may be able to produce high tagging accuracy in general, for example higher accuracy than comparable tagging performed using hidden Markov models in some embodiments. To benefit from Bi-LSTM and CRF strengths, the concepts may be combined to form a Bi-LSTM-CRF network 1010. The hidden states of Bi-LSTM may be considered as the feature vectors of the words of the phrase 1012 being analyzed by the final CRF layer, from which the final predicted tag sequence for the input sentence may be decoded. Considering dependencies across the output label in the receipt extraction task, instead of using softmax functions in the output layer of Bi-LSTM, CRF may be used to do classification decisions. In the example of FIG. 10B, Bi-LSTM network 1010 is processing a sequence of text (phrase 1012) as an input at the bottom of the figure. Phrase 1012 may get filtered through the LSTM in both the forward and backward directions to produce two vector sequences 1014, which may be concatenated together and put through a final fully-connected layer 1016 to predict probabilities of each piece of text being classified as a specific type of entity. From there, the probabilities may be used in conjunction with transition probabilities (e.g., how likely is it that text may go from a vendor tag to an amount tag vs another type of tag?). These two sets of probabilities may be used in the CRF to decode a probable sequence of tags using a dynamic programming process such as the Viterbi decoding algorithm or another similar algorithm.

Figure 10C:
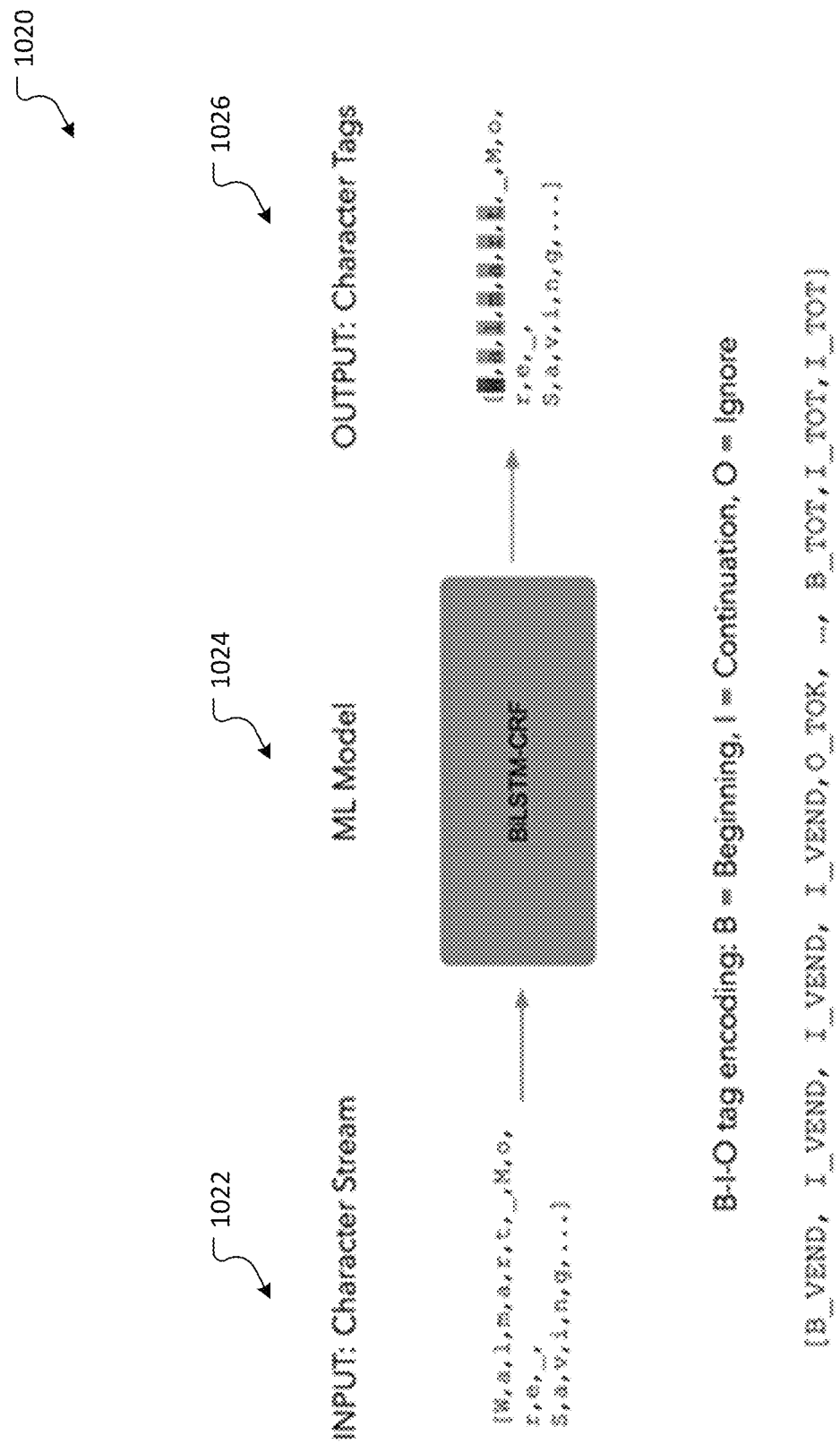
FIG. 10C shows an example character level bidirectional long short-term memory conditional random field extraction according to an embodiment of the present disclosure.

FIG. 10C shows an example character level Bi-LSTM-CRF extraction 1020 according to an embodiment of the present disclosure. Text may be input as a character sequence 1022 for tagging at the character level. This may be performed due to the possibility of misspellings from OCR text that is being consumed for prediction. The input character sequence 1022 may be passed through the Bi-LSTM-CRF 1024 to produce a predicted tag sequence 1026. In some embodiments, tag sequence 1026 may have three different types of tags: (B) a beginning of specific entity tag, (I) a continuation of specific entity tag, and (O) a character than should be ignored and is not part of one of the specified entities of interest. The character sequence 1022 may be passed through the network 1024 and labeled given the above encoding scheme 1026, and then the tagging sequence may be post-processed to produce concatenated character sequences that correspond to identified entities.

At 906, user device 112 and/or server device 102 may use text classified at 904. For example, the extracted and processed text may be provided as the input for a named entity recognition (for example, a separate Bi-LSTM-CRF may consume the text in each box to determine different specific information (vendor_name, date, etc.). Recognized text may be placed into appropriate entries in one or more forms. For example, in the case of an expense report, vendor name may be placed in a payee entry, date may be placed in an expense date entry, etc. Other use cases may extract information from other types of form and document images. For example, the same process may be used to identify fields in a W-2 tax document, to identify line item amounts in received invoice document, or to extract information about employees from their past paystubs for payroll filing setup, among other uses.

Figure 11:
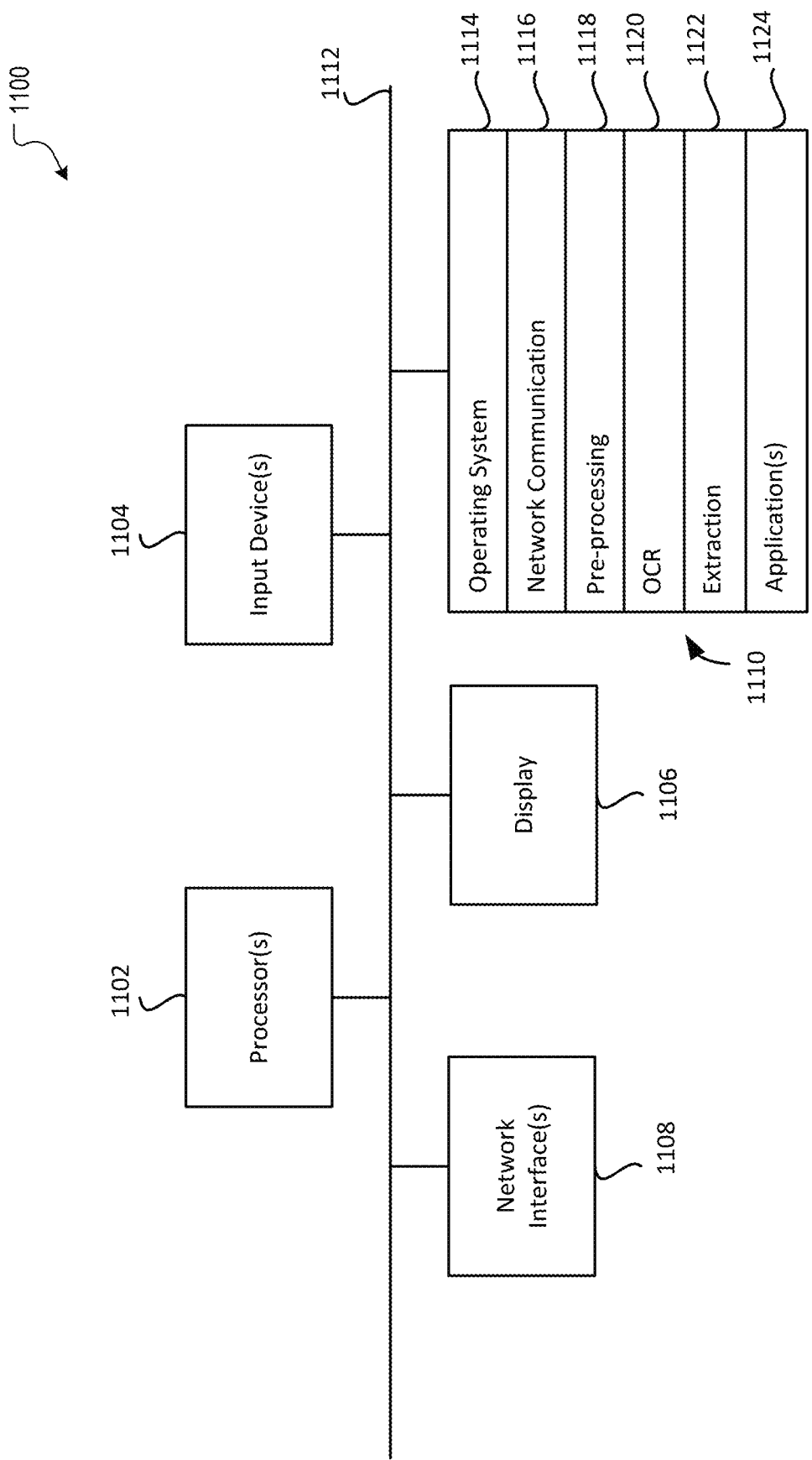
FIG. 11 shows a computing device according to an embodiment of the present disclosure.

FIG. 11 shows a computing device according to an embodiment of the present disclosure. For example, computing device 1100 may function as user device 112 or server device 102 to perform any or all of the processing described herein. The computing device 1100 may be implemented on any electronic device that runs software applications derived from compiled instructions, including without limitation personal computers, servers, smart phones, media players, electronic tablets, game consoles, email devices, etc. In some implementations, the computing device 1100 may include one or more processors 1102, one or more input devices 1104, one or more display devices 1106, one or more network interfaces 1108, and one or more computer-readable mediums 1110. Each of these components may be coupled by bus 1112, and in some embodiments, these components may be distributed among multiple physical locations and coupled by a network.

Display device 1106 may be any known display technology, including but not limited to display devices using Liquid Crystal Display (LCD) or Light Emitting Diode (LED) technology. Processor(s) 1102 may use any known processor technology, including but not limited to graphics processors and multi-core processors. Input device 1104 may be any known input device technology, including but not limited to a keyboard (including a virtual keyboard), mouse, track ball, and touch-sensitive pad or display. Input device 1104 may include sensor 114. Bus 1112 may be any known internal or external bus technology, including but not limited to ISA, EISA, PCI, PCI Express, NuBus, USB, Serial ATA or FireWire. Computer-readable medium 1110 may be any medium that participates in providing instructions to processor(s) 1102 for execution, including without limitation, non-volatile storage media (e.g., optical disks, magnetic disks, flash drives, etc.), or volatile media (e.g., SDRAM, ROM, etc.).

Computer-readable medium 1110 may include various instructions 1114 for implementing an operating system (e.g., Mac OS®, Windows®, Linux, Android®, etc.). The operating system may be multi-user, multiprocessing, multitasking, multithreading, real-time, and the like. The operating system may perform basic tasks, including but not limited to: recognizing input from input device 1104; sending output to display device 1106; keeping track of files and directories on computer-readable medium 1110; controlling peripheral devices (e.g., disk drives, printers, etc.) which can be controlled directly or through an I/O controller; and managing traffic on bus 1112. Network communications instructions 1116 may establish and maintain network connections (e.g., software for implementing communication protocols, such as TCP/IP, HTTP, Ethernet, telephony, etc.).

Pre-processing instructions 1118 may include instructions for implementing some or all of the pre-processing described herein. OCR instructions 1120 may include instructions for implementing some or all of the OCR processing described herein. Extraction instructions 1122 may include instructions for implementing some or all of the data extraction processing described herein.

Application(s) 1124 may be an application that uses or implements the processes described herein and/or other processes. For example, one or more applications may use data extracted by the data extraction processing described herein, for example filling in expense reports from receipt data or the like. The processes may also be implemented in operating system 1114.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java, JavaScript), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a Random Access Memory (RAM) or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer. In some embodiments, the computer may have audio and/or video capture equipment to allow users to provide input through audio and/or visual and/or gesture-based commands.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of transforming arbitrary image data into data suitable for optical character recognition (OCR) processing, the method comprising:

generating, by a processor, a plurality of intermediate feature layers of an image using convolutional neural network (CNN) processing;

after the plurality of intermediate feature layers have been generated, for each intermediate feature layer, generating, by the processor, at least two text proposals using a region proposal network (RPN), the at least two text proposals comprising a portion of the intermediate feature layer that is predicted to contain text;

after the at least two text proposals have been generated, merging, by the processor, at least two of the text proposals with one another to form a patch of the image that is predicted to contain text;

after the patch has been formed, determining, by the processor, outer coordinates of the patch, the outer coordinates comprising at least leftmost, rightmost, topmost, and bottommost coordinates; and after the outer coordinates have been determined, generating, by the processor, a quadrilateral of the image that is a smallest quadrilateral including the leftmost, rightmost, topmost, and bottommost coordinates.

2. The method of claim 1, further comprising:
defining, by the processor, a projective plane of the image including the quadrilateral; and
determining, by the processor, an inverse transformation of the projective plane of the image to transform the quadrilateral into a right angled rectangle.

3. The method of claim 1, further comprising cropping, by the processor, at least a portion of the image outside the quadrilateral.

4. The method of claim 1, further comprising performing, by the processor, OCR processing on image data within the quadrilateral.

5. The method of claim 1, further comprising training, by the processor, a machine learning model to recognize outer coordinates of patches within images using the quadrilateral as an input.

6. The method of claim 1, wherein the CNN, the RPN, or a combination thereof are components of a faster region-based convolutional neural network (Faster R-CNN) architecture executed by the processor.

7. The method of claim 1, wherein the merging comprises:
identifying at least two horizontally-aligned text proposals or merged regions and merging them into a first region;
identifying at least two vertically-aligned text proposals or merged regions and merging them into a second region; and
merging the first region and the second region.

8. The method of claim 1, wherein the merging comprises selecting the at least two text proposals from among all of the text proposals on the basis of the at least two text proposals having an x coordinate or y coordinate in common or respectively having adjacent x coordinates or y coordinates.

9. An optical character recognition (OCR) processing method, the method comprising:
generating, by a processor, a plurality of intermediate feature layers of an image using convolutional neural network (CNN) processing;
after the plurality of intermediate feature layers have been generated, for each intermediate feature layer, generating, by the processor, at least two text proposals using a region proposal network (RPN), the at least two text proposals comprising a portion of the intermediate feature layer that is predicted to contain text;

after the at least two text proposals have been generated, merging, by the processor, at least two of the text proposals with one another to form a patch of the image that is predicted to contain text;

after the patch has been formed, determining, by the processor, outer coordinates of the patch, the outer coordinates comprising at least leftmost, rightmost, topmost, and bottommost coordinates;

after the outer coordinates have been determined, generating, by the processor, a quadrilateral of the image that is a smallest quadrilateral including the leftmost, rightmost, topmost, and bottommost coordinates; and after the quadrilateral has been generated, performing, by the processor, OCR processing on image data within the quadrilateral.

10. The method of claim 9, further comprising:
defining, by the processor, a projective plane of the image including the quadrilateral; and
determining, by the processor, an inverse transformation of the projective plane of the image to transform the quadrilateral into a right angled rectangle.

11. The method of claim 9, further comprising cropping, by the processor, at least a portion of the image outside the quadrilateral.

12. The method of claim 9, further comprising training, by the processor, a machine learning model to recognize outer coordinates of patches within images using the quadrilateral as an input.

13. The method of claim 9, wherein the CNN, the RPN, or a combination thereof are components of a faster region-based convolutional neural network (Faster R-CNN) architecture executed by the processor.

14. The method of claim 9, wherein the merging comprises:
identifying at least two horizontally-aligned text proposals or merged regions and merging them into a first region;
identifying at least two vertically-aligned text proposals or merged regions and merging them into a second region; and
merging the first region and the second region.

15. The method of claim 9, wherein the merging comprises selecting the at least two text proposals from among all of the text proposals on the basis of the at least two text proposals having an x coordinate or y coordinate in common or respectively having adjacent x coordinates or y coordinates.

16. A system for transforming arbitrary image data into data suitable for optical character recognition (OCR) processing, the system comprising:
a memory configured to store an image and a plurality of instructions; and
a processor in communication with the memory configured to execute the instructions to thereby perform processing comprising:
generating a plurality of intermediate feature layers of the image using convolutional neural network (CNN) processing;
after the plurality of intermediate feature layers have been generated, for each intermediate feature layer, generating at least two text proposals using a region proposal network (RPN), the at least two text proposals comprising a portion of the intermediate feature layer that is predicted to contain text;

after the at least two text proposals have been generated, merging at least two of the text proposals with one another to form a patch of the image that is predicted to contain text;

after the patch has been formed, determining outer coordinates of the patch, the outer coordinates comprising at least leftmost, rightmost, topmost, and bottommost coordinates; and after the outer coordinates have been determined, generating a quadrilateral of the image that is a smallest quadrilateral including the leftmost, rightmost, topmost, and bottommost coordinates.

17. The system of claim 16, wherein the processing further comprises:

defining a projective plane of the image including the quadrilateral; and determining an inverse transformation of the projective plane of the image to transform the quadrilateral into a right angled rectangle.

18. The system of claim 16, wherein the processing further comprises cropping at least a portion of the image outside the quadrilateral.

19. The system of claim 16, wherein the processing further comprises performing OCR processing on image data within the quadrilateral.

20. The system of claim 16, wherein the processing further comprises training a machine learning model to recognize outer coordinates of patches within images using the quadrilateral as an input.

21. The system of claim 16, wherein the CNN, the RPN, or a combination thereof are components of a faster region-based convolutional neural network (Faster R-CNN) architecture executed by the processor.

22. The system of claim 16, wherein the merging comprises:

identifying at least two horizontally-aligned text proposals or merged regions and merging them into a first region;

identifying at least two vertically-aligned text proposals or merged regions and merging them into a second region; and merging the first region and the second region.

23. The system of claim 16, wherein the merging comprises selecting the at least two text proposals from among all of the text proposals on the basis of the at least two text proposals having an x coordinate or y coordinate in common or respectively having adjacent x coordinates or y coordinates.

* * * * *